United States Patent

Takahashi et al.

[11] Patent Number: 6,081,387
[45] Date of Patent: Jun. 27, 2000

[54] PROJECTION LENS

[75] Inventors: Masayuki Takahashi, Osaka; Syunsuke Kimura, Hyogo, both of Japan

[73] Assignee: Matsushita Electric Industrial Co., Ltd., Osaka, Japan

[21] Appl. No.: 09/083,146

[22] Filed: May 21, 1998

[30] Foreign Application Priority Data

Sep. 29, 1997 [JP] Japan ................................... 9-264494

[51] Int. Cl.[7] ............................... G02B 3/00; G02B 3/02
[52] U.S. Cl. ........................................ 359/649; 359/714
[58] Field of Search ................................... 359/649, 650, 359/763, 764, 767, 708, 713–714

[56] References Cited

U.S. PATENT DOCUMENTS

| | | | |
|---|---|---|---|
| 5,329,363 | 7/1994 | Moskovich | 359/649 |
| 5,357,373 | 10/1994 | Yoshioka et al. | 359/649 |
| 5,440,429 | 8/1995 | Kim | 359/649 |
| 5,572,364 | 11/1996 | Toide et al. | 359/649 |
| 5,808,804 | 9/1998 | Moskovich | 359/649 |

*Primary Examiner*—Georgia Epps
*Assistant Examiner*—Jordan M. Schwartz
*Attorney, Agent, or Firm*—Merchant & Gould P.C.

[57] ABSTRACT

A projection lens comprises 5 lenses in 5 groups including: a first-group lens that is a positive lens; a second-group lens that is a positive lens having the largest positive power (the inverse number of focal length) in the whole lens system; a third-group lens that is a positive lens; a fourth-group lens that is a positive lens; and a fifth-group lens that is a negative lens with its concave surface facing a screen side, in order from the screen side, wherein each lens of the first, third, fourth and fifth groups has at least one aspheric surface. The distance between the first-group lens and the second-group lens is relatively short, and the positive power in the fourth-group lens is relatively high. In the projection lens, an optical focal shift due to the temperature change in the fifth-group lens is hardly caused, and therefore a projection lens with minimal distortion aberration can be provided at a low cost.

7 Claims, 11 Drawing Sheets

PROJECTION LENS

FIELD OF THE INVENTION

The present invention relates to a projection lens. Particularly, the present invention relates to a projection lens that is suitable for use in a projection TV in which cathode ray tube images are magnified and projected on a screen.

BACKGROUND OF THE INVENTION

In a projection TV, color images are projected on a large screen by magnifying, projecting and synthesizing images from three monochrome CRTs (cathode ray tube) for B (blue), G (green), and R (red) through a projection lens. Recently, while demand for big-screen TVs rises even in ordinary homes, demand for projection TVs has also increased. There has been demand for a projection TV set that has an image quality equivalent to that of a television and is compact.

Thus, a projection lens having a high aperture ratio, a wide angle and excellent imaging performance has been required. Conventionally, these lenses have been formed only of glass or formed only of plastic in order to reduce manufacturing costs. However, recently, a hybrid lens in which glass lenses and plastic lenses having aspheric surfaces are coupled has been widely used as a lens that can be manufactured at a low cost and satisfies the conditions mentioned above.

In order to improve contrast, the lens nearest to the CRT side mainly for correcting field curvature and a CRT faceplate are coupled optically in many structures. In this structure, a thin lens (a shell lens) having uniform thickness is used in most cases, so that the lens functions as a strong concave lens by optically coupling the CRT faceplate and the shell lens using a liquid or the like. On the other hand, in order to obtain excellently focused images from center to periphery, it is necessary to correct sufficiently the optical aberration of field curvature. In a recent compact TV set, a projection lens having a wide angle with a half angle of view of more than 35 degrees also is used. Since the aberration of field curvature becomes greater as the lens has a wider angle, it is very difficult to correct the aberration only by a projection lens. In this case, as a method for reducing the burden of correcting the aberration of field curvature by a projection lens, there is a method using CRTs in which the fluorescent screen of a CRT faceplate has a concave surface on the screen side. In a recent compact TV set, this method is generally applied.

Since the performance of CRTs, lenses, screens, electric circuits and the like has been improved, the image quality of a recent projection TV has been closely approaching that of a television with a direct viewing tube. In addition, as to compactness, a projection TV is rather smaller in depth than a television with a direct viewing tube when both have the same screen size. The projection TV is inferior to the television with a direct viewing tube in the stability of image quality. Particularly, there is a difference between the image quality when turning on the projection TV and that after using it for many hours. In the case where the optical focus on a screen is adjusted to be optimum when the projection TV is turned on, image quality is deteriorated after using the projection TV for many hours since the optical focus on a screen is shifted.

The reason for the optical focal shift due to temperature change is that the coefficients of linear expansion of plastic materials used in plastic lenses and a liquid (an optical coupling liquid) used for the optical coupling mentioned above are greater than that of an optical glass, and therefore the refractive index fluctuation with respect to the temperature change is great. Particularly, as the temperature of a CRT faceplate increases after turning on the projection TV, the temperature of the optical coupling liquid contacting with the faceplate and a shell lens contacting with the optical coupling liquid increases. Consequently, the focal length of a concave lens that is formed of a shell lens and an optical coupling liquid becomes long, and the total focal length and back focus of the all lenses become short. Thus, the optical focus is shifted and therefore the image quality is deteriorated.

As a method for solving the problem described above, there is a method in which the back focus is corrected so as not to become short by shifting the shell lens toward the screen side as temperature increases. Although patent applications related to this method have been filed, the method has not been put into practical use widely. The reason is that a mechanical structure that shifts the shell lens suitably in the direction of an optical axis without giving the shell lens any tilt is required, thus increasing the costs.

SUMMARY OF THE INVENTION

Taking such conventional problems into consideration, the present invention aims to provide a bright and wide-angle projection lens that is cheap as an optical system and has an excellent and stable optical performance by providing a lens structure in which the optical focal shift due to temperature change described above is corrected by plastic lenses having a positive power (the inverse number of focal length) and the distortion aberration generated by the correction is made as small as possible.

By using such a projection lens, the present invention also aims to provide image-magnifying projection systems, video projectors and projection TVs in which an excellent optical performance can be maintained continuously.

In order to attain the objects described above, a projection lens of the present invention is characterized by having a structure comprising 5 lenses in 5 groups including: a first-group lens that is a positive lens; a second-group lens that is a positive lens having the largest positive power in the whole lens system; a third-group lens that is a positive lens; a fourth-group lens that is a positive lens; and a fifth-group lens that is a negative lens with its concave surface facing a screen side, in order from the screen side, wherein each lens of the first, third, fourth and fifth groups has at least one aspheric surface and the following conditions are satisfied.

(1) $0.0 < f0/f1 < 0.2$ (2) $0.6 < f0/f2 < 0.9$ (3) $0.6 < |f5/f34| < 0.8$ (4) $0.0 < d2/f0 < 0.2$ f0: Focal length of the whole projection lens system f1: Focal length of the first-group lens f2: Focal length of the second-group lens f5: Focal length of the fifth-group f34: Synthesized focal length of the third-group lens and the fourth-group lens d2: Air space between the first-group lens and the second-group lens The projection lens of the present invention has the structure described above. Therefore, the optical focal shift caused by the temperature change in the fifth-group lens, particularly, the temperature change from a CRT faceplate, can be restrained to a low level. Thus, the projection lens of the present invention can stably maintain excellent optical performance having less distortion aberration at a low cost.

An image-magnifying projection system of the present invention is characterized by comprising the projection lens described above, a CRT that projects images, and a unit for coupling the projection lens and the CRT. According to the present invention, also in the case where the temperature of a CRT faceplate changes, the optical focus position of the images (the position of the optimum focal plane of image) does not change. Consequently, excellent magnified images can be obtained continuously.

A video projector of the present invention is characterized by comprising three image-magnifying projection systems described above, each of which comprises a monochrome CRT of the color blue, green or red, wherein the magnified images obtained from the image-magnifying projection systems are synthesized on a screen. Either a reflecting screen or a transmission screen can be used as the screen. According to the present invention, the focusing performance for imaging does not change when the temperature in a CRT faceplate changes. Consequently, the set-up time for obtaining an excellent optical focusing performance after turning on the video projector is not required, which is required conventionally, and therefore the video projector can be used immediately. Thereafter, excellent images can be obtained stably.

Furthermore, a projection TV of the present invention is characterized by comprising the image-magnifying projection system described above, a mirror that reflects beams projected from the projection lens, and further a transmission screen on which images are formed by the projected beams. According to the present invention, after turning on the projection TV, optical focus on the screen is not shifted as time passes, and therefore excellent images can be viewed continuously.

It is preferable that the projection lens of the present invention has a half angle of view of 35 degrees or more and the F-number is 1.1 or less. The projection lens having a half angle of view of 35 degrees or more provides a compact TV set. Moreover, very bright images can be obtained by having the F-number 1.1 or less.

DETAILED DESCRIPTION OF THE INVENTION

Embodiment 1

Figure 1:
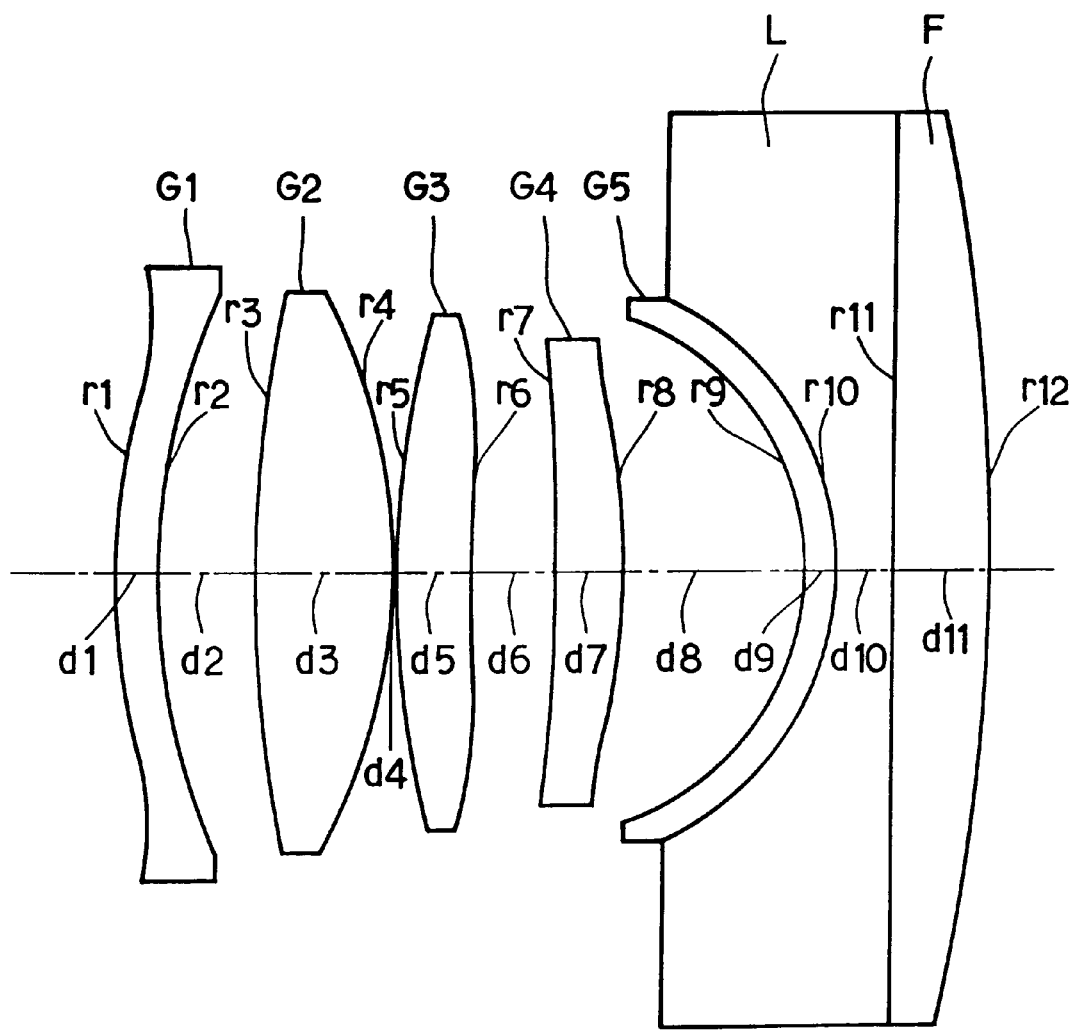
FIG. 1 is a structural view of a projection lens according to Example 1 of Embodiment 1.

A projection lens according to Embodiment 1 of the present invention will be explained referring to the drawings.

Figure 5:
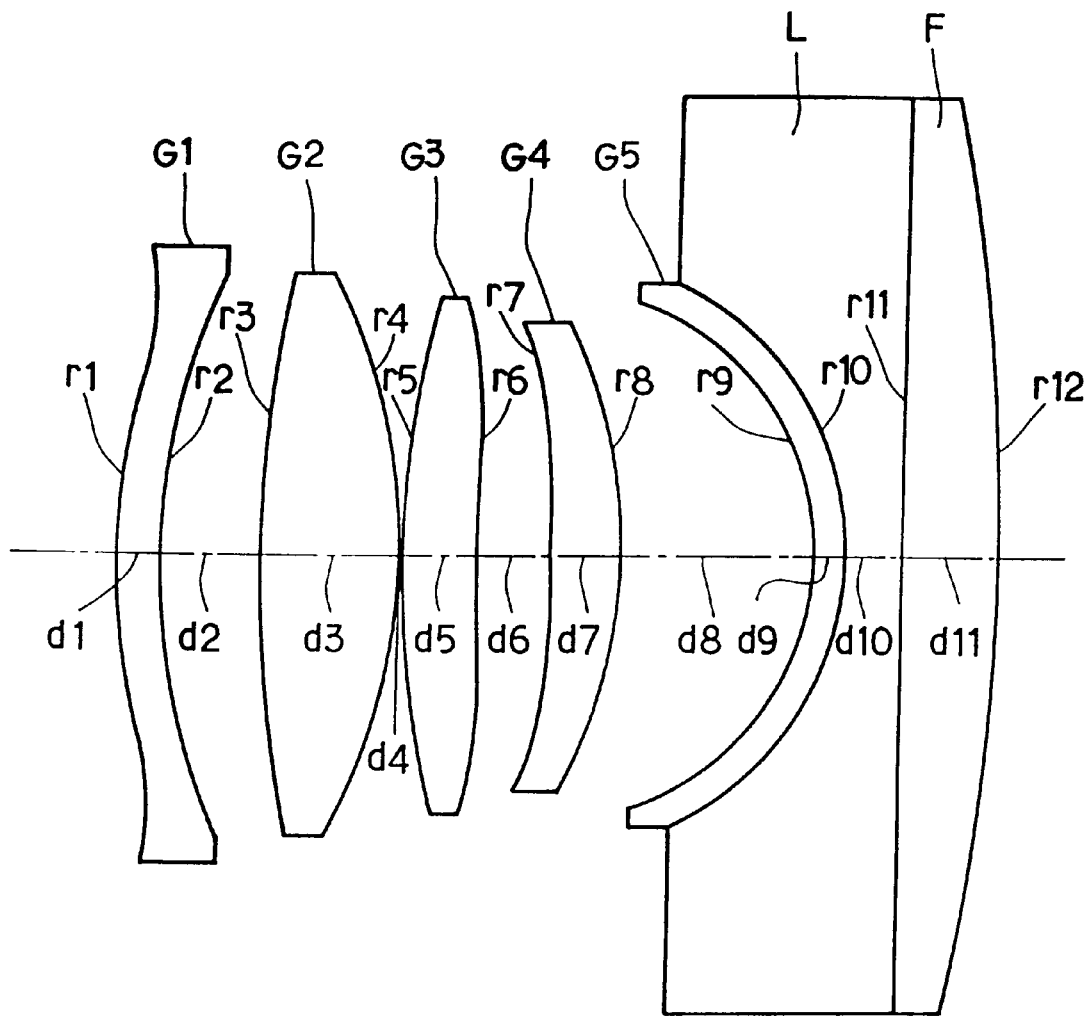
FIG. 5 is a structural view of a projection lens according to Example 2 of Embodiment 1.
Figure 7:
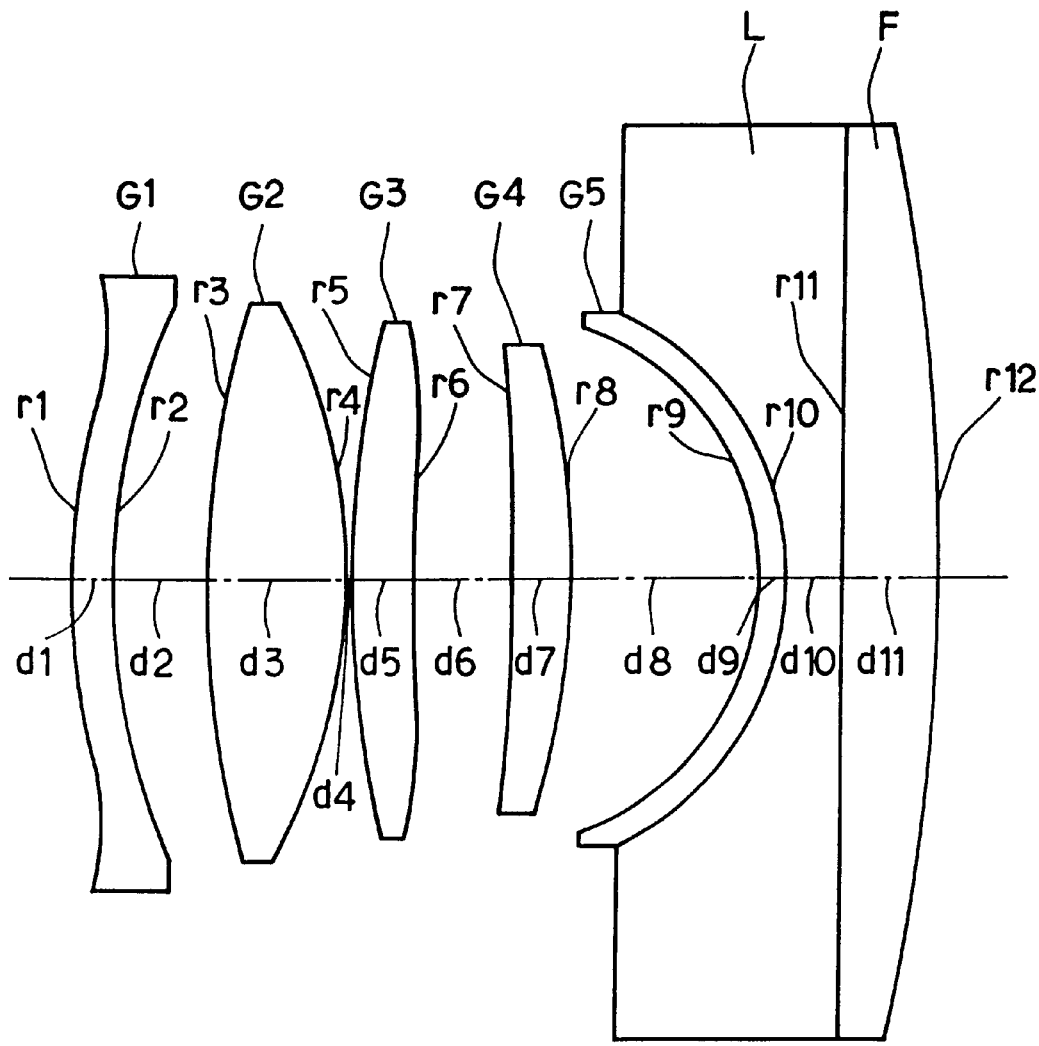
FIG. 7 is a structural view of a projection lens according to Example 3 of Embodiment 1.

FIGS. 1, 5 and 7 are structural views of projection lenses according to Examples 1, 2 and 3 in Embodiment 1, respectively. In the projection lens according to the invention described in claim 1, all lenses in the first to fourth groups have a positive power. The second-group lens has the highest positive power in the whole lens system and the fourth-group lens has the second highest positive power. The fifth-group lens is a lens having a negative power with its concave surface facing the screen side and mainly corrects field curvature. Each of the first-group lens and the third-group lens has a function mainly for correcting spherical aberration and coma-aberration. The second-group lens handles a considerable part of positive power in this lens system. The fourth-group lens handles a certain part of positive power in this lens system and has a function mainly for correcting coma-aberration at the same time. Based on such functions of each lens group, each lens of the first, third, fourth and fifth groups has at least one aspheric surface. Preferably, both surfaces of each lens of the first, third and fourth groups are aspheric. The present invention is characterized in that the optical focal shift caused by the refractive index fluctuation due to the temperature change in the fifth-group concave lens formed of a plastic shell lens and an optical coupling liquid is corrected by the refractive index fluctuation due to the temperature change in plastic lenses having a positive power in the fourth and third groups located near to the fifth group, thus realizing images having an excellent optical performance and stability.

The condition (1) for attaining the objects of the present invention relates to the power of the first-group lens. Below the lower limit of the condition (1), the position of F-number beam in the second group becomes high and the power in the second group increases, thus increasing the costs for the glass lenses. Above the upper limit, the optical focus is shifted by the refractive index fluctuation due to the temperature change in plastic lenses. When a plastic lens having a negative power is located near a first group as in JP 2,528,771, the optical focal shift can be corrected also above the upper limit. However, in the structure of the invention (JP 2,528,771), the number of lens increase, thus increasing the manufacturing costs.

The condition (2) relates to the power of the second group. Below the lower limit, the positive power handled in the first group and the like become high, thus shifting the optical focus by the temperature change. On the other hand, above the upper limit, the power of the second group becomes high and therefore it is difficult to correct the spherical aberration and coma-aberration caused in this group by means of other lenses.

The condition (3) is for correcting the optical focal shift due to the change in the focal length of the fifth-group lens having a negative power formed of the shell lens and the optical coupling liquid mentioned above, which is caused by the temperature change in a CRT faceplate, by changing the focal length due to the temperature change in the plastic lenses having a positive power in the third- and fourth-groups. When no function for correcting the optical focal shift due to the temperature change in the fifth group is provided for the third- and fourth-groups lenses as in the present invention and the optical focus on a screen is adjusted to be optimum at the time of turning on a TV set or the like, after using the TV set or the like for many hours the temperature in the fifth-group lens (including the optical coupling liquid) increases, as the temperature in the CRT faceplate increases. Consequently, the refractive index decreases and the negative power of the fifth-group lens decreases. Therefore, the positive power becomes high in the whole lens system in total, and the position of the optical focus on a screen shifts in the direction approaching the lenses, thus deteriorating images as time passes after turning on the TV set or the like.

In the present invention, considering that the temperature of the lenses (the third group and the fourth group) near the fifth group increases almost proportionally as the temperature in the fifth group increases, plastic lenses having a positive power are located near the fifth group suitably and the focal shift of the fifth group is corrected by the change (change in the opposite direction to that of the fifth group) in the focal length of the lenses near the fifth group, thus reducing the optical focal shift. The change in focal length due to the temperature change in the fifth group is overcorrected below the lower limit of the condition (3) and is not corrected sufficiently above the upper limit. In both cases, the optimum optical focus on a screen is shifted, thus causing the deterioration of image quality.

The condition (4) relates to the air space between the first-group lens and the second-group lens. In a lens system of the present invention, the distortion aberration at the side of a fluorescent screen in a CRT has a barrel shape. The barrel distortion aberration is caused by using a CRT in which a fluorescent screen (for example, the surface indicated with r12 in FIG. 1) of a CRT faceplate has a concave surface in the screen side in order to reduce the burden of correcting the aberration of field curvature by a projection lens as described above, and because the principal rays at the peripheral angle of view are refracted in the direction of the barrel distortion aberration when passing through the first-, second-, third- and fourth-group lenses. In some cases, the distortion aberration exceeds −10% depending on the lens structure. In this case, the peripheral raster on a fluorescent screen in a CRT has to be reduced, thus causing the deterioration of image quality. In order to reduce this distortion aberration, in most of the examples disclosed in patents, a lens having a low positive power is located in the vicinity of the fifth-group lens in which the position of the principal ray of the peripheral angle of view becomes high. However, in the present invention, a lens having a strong positive power at a certain level has to be located in the vicinity of the fifth group in order to satisfy the condition (3). The condition (4) is a condition for reducing the barrel distortion aberration while satisfying the condition (3). In a lens structure in which all lenses in the first to fourth groups have positive power as in the present invention, when a lens is located at a CRT side with respect to the position where the principal ray of the peripheral angle of view and the optical axis cross, the lens functions so as to cause barrel distortion aberration. On the other hand, when a lens is located at a screen side, the lens functions so as to restrain the barrel distortion aberration. As in the present invention, when the second-group lens has a strong positive power, the position of the second-group lens has a great effect on the distortion aberration. The condition (4) defines the position of the second-group lens. In the case of not exceeding the upper limitation, the second-group lens functions so as to restrain the distortion aberration in the periphery. When exceeding the upper limit, the second-group lens has hardly any effect on the distortion aberration or functions so as to cause the distortion aberration.

The condition (5) in claim 2 relates to the focal lengths in the third and fourth groups. The fourth-group lens has a function mainly for correcting the peripheral coma-aberration and tends to have a lens shape with a negative function in its periphery. As already described above, when correcting the change in the focal length due to the temperature change in the fifth-group lens through the third and the fourth lenses, in order to correct the optical focal shift due to temperature change from the center to the periphery of the screen excellently, it is preferable that the shape of the fourth-group lens is a convex meniscus lens shape having a positive power from the center to the effective diameter. When exceeding the upper limit of the condition (5), the positive power of the fourth-group lens becomes low and the periphery of the lens has a negative power. Consequently, the optical focal shift due to the temperature change can not be corrected suitably from the center to the periphery of the screen.

Examples 1–3 are shown as specific value examples of the present invention as follows.

EXAMPLE 1

FIG. 1 is a structural view of a projection lens according to Example 1 of Embodiment 1 of the present invention. Example 1 is an example designed for the purposes of obtaining excellent optical performance (MTF), restraining the change in the back focus within 0.05 mm also in the case where the temperature of the optical coupling liquid of the fifth group changes from 20° C. to 66° C., and restraining the distortion aberration within −6% in a projection lens of $F_{NO}$=1.1, focal length f0=77.6, magnifying power=9.2, half angle of view=39° by satisfying the conditions described in claim 1.

In FIG. 1, a first-group lens G1, a third-group lens G3, a fourth-group lens G4, and a shell lens G5 as a fifth-group lens are plastic lenses made of acrylic resins, and a second-group lens G2 is a glass lens made of SK5. A fill L between a CRT faceplate F and the fifth-group shell lens G5 is the optical coupling liquid described above, and is filled for the purpose of preventing the contrast between the CRT and the lens from decreasing, cooling the heat generated by the CRT, or the like.

In the structural view of a projection lens in FIG. 1, ri indicates a radius of curvature of each lens surface and di indicates the thickness of each lens or the distance between lenses.

The shape of the aspheric surface is a rotationally symmetric aspheric surface expressed by the following formula, wherein X indicates the displacement magnitude from the vertex of the lens at the position of the radius length h of the aperture from the optical axis of the lens.

Formula 1

$$x = \frac{h^2/r}{1+\{1-(h/r)^2\}^{1/2}} + \sum_{i=3}^{10} a_i \cdot h^i$$

The indication mentioned above is the same also in Examples 2 and 3 below.

Next, specific values are shown in Table 1. In the Table, ni indicates a refractive index on the e-line on each surface.

Figure 2:
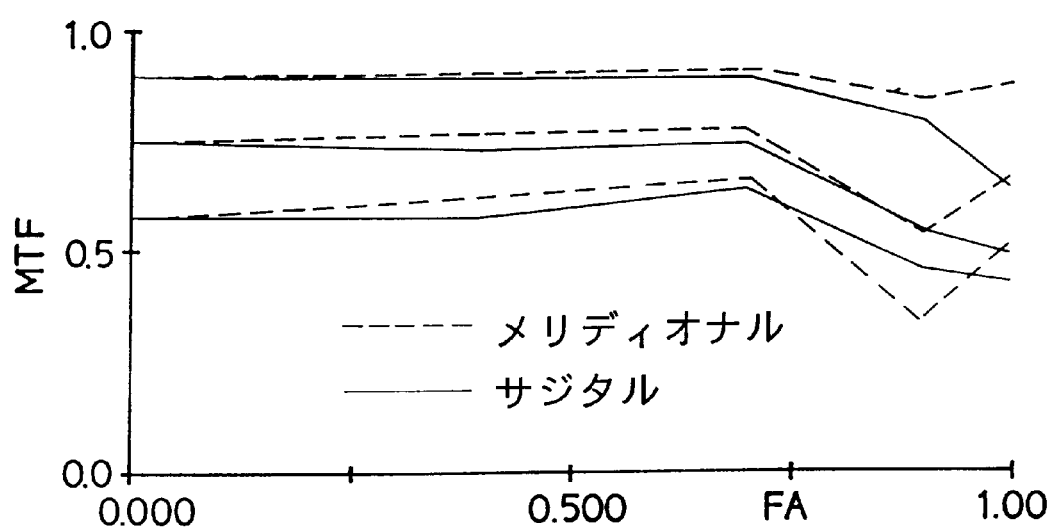
FIG. 2 is a performance chart showing the optical performance (MTF) of a projection lens according to Table 1 in Example 1 of Embodiment 1.

Table 1 shows values in the case where each lens of all groups in Example 1 has a temperature of 20° C. The optical performance (MTF) in this case is shown in FIG. 2. To obtain the MTF data in FIG. 2, green light is simulated at 1, 2, and 3 lp/mm sequentially from the top. The unbroken line indicates the beam in the sagittal direction and the broken line indicates the beam in the meridional direction. Such conditions are the same in FIGS. 3, 4, 6, and 8 described below.

TABLE 1

| Surface Radius (mm) | Distance between Surfaces in the Axial Direction (mm) | Ne |
|---|---|---|
| r 1 = 80.725 | d 1 = 6.50 | n 1 = 1.49383 |
| r 2 = 124.311 | d 2 = 14.00 | |
| r 3 = 170.089 | d 3 = 21.00 | n 2 = 1.59142 |
| r 4 = −91.994 | d 4 = 1.20 | |
| r 5 = 178.461 | d 5 = 10.50 | n 3 = 1.49383 |
| r 6 = 267.383 | d 6 = 5.24 | |
| r 7 = 2719.667 | d 7 = 10.00 | n 4 = 1.49383 |
| r 8 = −117.583 | d 8 = 27.22 | |
| r 9 = −46.187 | d 9 = 4.00 | n 5 = 1.49383 |
| r10 = −45.000 | d10 = 9.24 | n 5' = 1.44500 |
| r11 = 0.000 | d11 = 14.10 | n 6 = 1.56560 |
| r12 = −350.000 | | |

(1) f0/f1 = 77.6/444.3 = 0.17
(2) f0/f2 = 77.6/104.0 = 0.75
(3) |f5/f34| = |−130.3/193.5| = 0.67
(4) d2/f0 = 14/77.6 = 0.18
(5) f4/f3 = 228.5/1045.8 = 0.22

The aspheric coefficients in each surface are as follows.

| (The aspheric coefficients in the first surface) | (The aspheric coefficients in the second surface) |
|---|---|
| a 3 = 1.87681 × $10^{-5}$ | a 3 = −1.10425 × $10^{-5}$ |
| a 4 = −2.59360 × $10^{-6}$ | a 4 = 2.02083 × $10^{-6}$ |
| a 5 = 5.81068 × $10^{-8}$ | a 5 = −9.47722 × $10^{-8}$ |
| a 6 = −1.92555 × $10^{-9}$ | a 6 = 1.60407 × $10^{-9}$ |
| a 7 = −4.42802 × $10^{-12}$ | a 7 = 5.87873 × $10^{-14}$ |
| a 8 = 3.82300 × $10^{-13}$ | a 8 = −1.32955 × $10^{-13}$ |
| a 9 = 0.0 | a 9 = 0.0 |
| a10 = 8.86046 × $10^{-18}$ | a10 = 6.46745 × $10^{-17}$ |

| (The aspheric coefficients in the fifth surface) | (The aspheric coefficients in the sixth surface) |
|---|---|
| a 3 = −6.70834 × $10^{-6}$ | a 3 = −1.09845 × $10^{-5}$ |
| a 4 = −2.61121 × $10^{-7}$ | a 4 = −9.47340 × $10^{-7}$ |
| a 5 = 4.43894 × $10^{-9}$ | a 5 = −1.30142 × $10^{-7}$ |
| a 6 = −1.29716 × $10^{-9}$ | a 6 = 2.95619 × $10^{-9}$ |
| a 7 = 7.45180 × $10^{-11}$ | a 7 = 1.70295 × $10^{-11}$ |
| a 8 = −7.39091 × $10^{-13}$ | a 8 = −5.75044 × $10^{-13}$ |
| a 9 = 0.0 | a 9 = 0.0 |
| a10 = −5.32993 × $10^{-17}$ | a10 = −1.16618 × $10^{-17}$ |

| (The aspheric coefficients in the seventh surface) | (The aspheric coefficients in the eighth surface) |
|---|---|
| a 3 = 6.68500 × $10^{-6}$ | a 3 = −2.86167 × $10^{-5}$ |
| a 4 = −3.94174 × $10^{-6}$ | a 4 = 3.17981 × $10^{-6}$ |
| a 5 = 1.90456 × $10^{-7}$ | a 5 = −1.21156 × $10^{-7}$ |
| a 6 = −8.51355 × $10^{-9}$ | a 6 = 1.41600 × $10^{-10}$ |
| a 7 = 6.89058 × $10^{-11}$ | a 7 = 1.46289 × $10^{-11}$ |
| a 8 = 3.78982 × $10^{-12}$ | a 8 = 2.22359 × $10^{-12}$ |
| a 9 = 0.0 | a 9 = 0.0 |
| a10 = −1.35098 × $10^{-15}$ | a10 = −7.48012 × $10^{-16}$ |

| (The aspheric coefficients in the ninth surface) |
|---|
| a 3 = −3.10913 × $10^{-4}$ |
| a 4 = 2.23803 × $10^{-5}$ |
| a 5 = −7.83962 × $10^{-7}$ |
| a 6 = 6.81945 × $10^{-9}$ |
| a 7 = 5.73234 × $10^{-12}$ |
| a 8 = 3.64569 × $10^{-12}$ |
| a 9 = 0.0 |
| a10 = −2.05650 × $10^{-15}$ |

Figure 3:
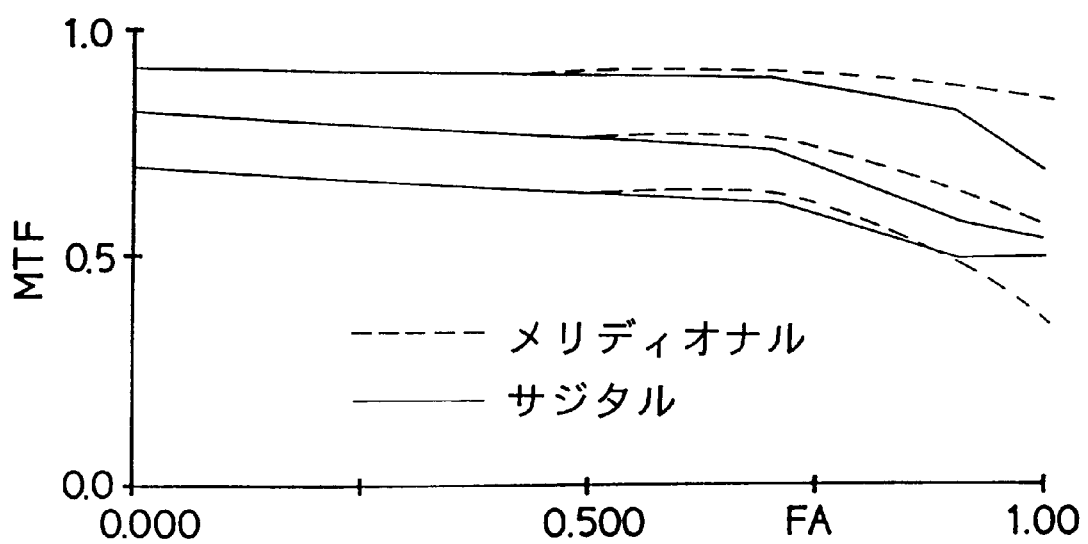
FIG. 3 is a performance chart showing the optical performance (MTF) of a projection lens according to Table 2 in Example 1 of Embodiment 1.

Next, FIG. 3 shows optical performance (MTF) in the case where the temperature of the optical coupling liquid increases to 66° C. as shown in Table 2. It can be seen that the optical performance also is not decreased in the case where the temperature of the optical coupling liquid changes. Since the values in Table 2 should be the same as those in Table 1 except the refractive index in each group, only the values of refractive index with respect to the temperature in each group are shown in FIG. 2. The change of refractive index due to the temperature in the glass lens of the second group is greatly smaller than that of the plastic lens or the optical coupling liquid. Therefore, a refractive index at 20° C. was employed.

TABLE 2

| | Temperature | Ne |
|---|---|---|
| The first-group Lens | 25° C. | n 1 = 1.49320 |
| The second-group Lens | 20° C. | n 2 = 1.59144 |
| The third-group Lens | 46° C. | n 3 = 1.49053 |
| The fourth-group Lens | 50° C. | n 4 = 1.49002 |
| The fifth-group Lens | 60° C. | n 5 = 1.48875 |
| Optical Coupling Liquid | 66° C. | n 5' = 1.43130 |

(1) f0/f1 = 77.6/444.9 = 0.17
(2) f0/f2 = 77.6/104.0 = 0.75
(3) |f5/f34| = |−135.6/194.9| = 0.67
(4) d2/f0 = 14/77.6 = 0.18
(5) f4/f3 = 230.3/1053.1 = 0.22

Figure 4:
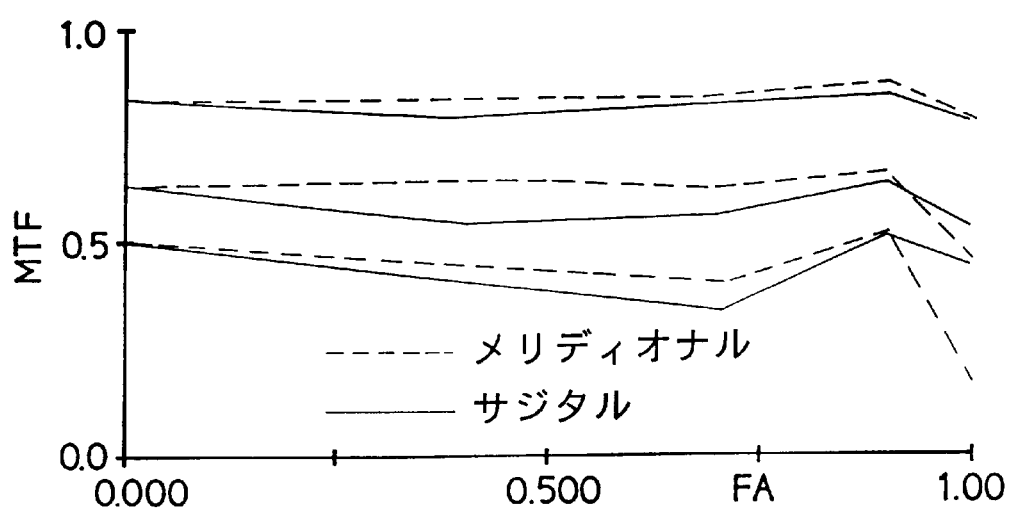
FIG. 4 is a performance chart showing the optical performance (MTF) of a projection lens according to Table 3 in Example 1 of Embodiment 1.

In order to make the effect of the present invention clear, Table 3 shows an example in the case where the third group and the fourth group have no function for correcting the focal shift due to temperature change. In this example, the values of the third group and the fourth group in Table 1 are employed so as not to have the correction effect due to the temperature increase also in the case where the temperature in the first group and the fifth group increases as shown in Table 2. FIG. 4 shows the optical performance (MTF) in this case. It can be seen that the MTF is decreased compared to that shown in FIG. 3.

TABLE 3

| | Temperature | Ne |
|---|---|---|
| The first-group Lens | 25° C. | n 1 = 1.49320 |
| The second-group Lens | 20° C. | n 2 = 1.59144 |
| The third-group Lens | 20° C. | n 3 = 1.49383 |

TABLE 3-continued

|  | Temperature | Ne |
| --- | --- | --- |
| The fourth-group Lens | 20° C. | n 4 = 1.49383 |
| The fifth-group Lens | 60° C. | n 5 = 1.48875 |
| Optical Coupling Liquid | 66° C. | n 5' = 1.43130 |

(1) f0/f1 = 77.4/444.9 = 0.17
(2) f0/f2 = 77.4/104.0 = 0.74
(3) |f5/f34| = |−135.6/193.5| = 0.70
(4) d2/f0 = 14/77.4 = 0.18
(5) f4/f3 = 228.5/1045.8 = 0.22

EXAMPLE 2

FIG. 5 is a structural view of a projection lens according to Example 2 of Embodiment 1 of the present invention. In Example 2, the distance between the surfaces of the fourth group and the fifth group, especially the distance between the surfaces including the inside and outside of the effective diameter, is longer than in Example 1. The focus in the projection lens of the present invention is adjusted by shifting the first to fourth groups with respect to the fifth group. However, when a projection lens having a short distance between the surfaces of the fourth group and the fifth group is manufactured, a body tube in the side of the fourth group and a structure in the side of the fifth group interfere with each other in some cases. Therefore, the distance is lengthened as mentioned above in Example 2. Particularly, when using the projection lens at a high magnifying power, the distance between the fourth group and the fifth group becomes shorter than that when using the projection lens at a low magnifying power and the fourth group and the fifth group tend to interfere with each other. Therefore, FIG. 5 shows an example designed for the purpose of lengthening the distance between the fourth group and the fifth group compared to that in Example 1. The optical specification is the same as in Example 1 except the focal length f0=77.5.

Figure 6:
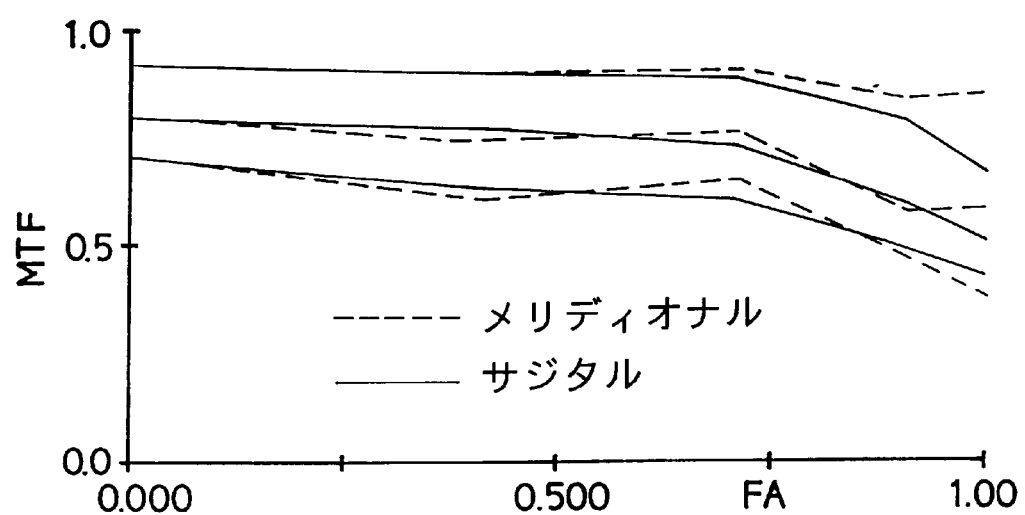
FIG. 6 is a performance chart showing the optical performance (MTF) of a projection lens according to Table 4 in Example 2 of Embodiment 1.

Next, Table 4 shows specific values in the case where the temperature in all groups is 20° C. FIG. 6 shows the optical performance (MTF) in this case.

TABLE 4

| Surface Radius (mm) | Distance between Surfaces in the Axial Direction (mm) | Ne |
| --- | --- | --- |
| r 1 = 81.583 | d 1 = 6.50 | n 1 = 1.49383 |
| r 2 = 126.617 | d 2 = 13.90 |  |
| r 3 = 154.637 | d 3 = 21.00 | n 2 = 1.59142 |
| r 4 = −96.571 | d 4 = 1.02 |  |
| r 5 = 184.870 | d 5 = 10.50 | n 3 = 1.49383 |
| r 6 = 211.081 | d 6 = 3.95 |  |
| r 7 = −1347.357 | d 7 = 10.00 | n 4 = 1.49383 |
| r 8 = −92.136 | d 8 = 28.85 |  |
| r 9 = −47.322 | d 9 = 4.00 | n 5 = 1.49383 |
| r10 = −45.000 | d10 = 9.24 | n 5' = 1.44500 |
| r11 = 0.000 | d11 = 14.10 | n 6 = 1.56560 |
| r12 = −350.000 |  |  |

(1) f0/f1 = 77.5/443.3 = 0.17
(2) f0/f2 = 77.5/103.7 = 0.75
(3) |f5/f34| = |−134.6/190.3| = 0.71
(4) d2/f0 = 13.9/77.5 = 0.18
(5) f4/f3 = 199.7/2662.2 = 0.08

The aspheric coefficients in each surface are as follows.

| (The aspheric coefficients in the first surface) | (The aspheric coefficients in the second surface) |
| --- | --- |
| a 3 = 1.68942 × 10$^{-5}$ | a 3 = −8.76774 × 10$^{-6}$ |
| a 4 = −2.50330 × 10$^{-6}$ | a 4 = 1.87831 × 10$^{-6}$ |
| a 5 = 5.91103 × 10$^{-8}$ | a 5 = −9.33932 × 10$^{-8}$ |
| a 6 = −1.90038 × 10$^{-9}$ | a 6 = 1.69119 × 10$^{-9}$ |
| a 7 = −3.05387 × 10$^{-12}$ | a 7 = 1.00747 × 10$^{-13}$ |
| a 8 = 4.19677 × 10$^{-13}$ | a 8 = −1.17847 × 10$^{-13}$ |
| a 9 = 0.0 | a 9 = 0.0 |
| a10 = −1.40839 × 10$^{-17}$ | a10 = 6.66865 × 10$^{-17}$ |

| (The aspheric coefficients in the fifth surface) | (The aspheric coefficients in the sixth surface) |
| --- | --- |
| a 3 = −2.30678 × 10$^{-6}$ | a 3 = −8.87462 × 10$^{-6}$ |
| a 4 = −4.99610 × 10$^{-7}$ | a 4 = −8.88655 × 10$^{-7}$ |
| a 5 = 5.30881 × 10$^{-9}$ | a 5 = −1.33587 × 10$^{-7}$ |
| a 6 = −1.10262 × 10$^{-9}$ | a 6 = 2.85493 × 10$^{-9}$ |
| a 7 = 7.37703 × 10$^{-11}$ | a 7 = 1.38636 × 10$^{-11}$ |
| a 8 = −8.25932 × 10$^{-13}$ | a 8 = −6.06054 × 10$^{-13}$ |
| a 9 = 0.0 | a 9 = 0.0 |
| a10 = −5.90196 × 10$^{-17}$ | a10 = 2.79370 × 10$^{-17}$ |

| (The aspheric coefficients in the seventh surface) | (The aspheric coefficients in the eighth surface) |
| --- | --- |
| a 3 = −6.18640 × 10$^{-6}$ | a 3 = −4.83849 × 10$^{-5}$ |
| a 4 = −3.71957 × 10$^{-6}$ | a 4 = 3.39259 × 10$^{-6}$ |
| a 5 = 1.82565 × 10$^{-7}$ | a 5 = −1.09831 × 10$^{-7}$ |
| a 6 = −9.30718 × 10$^{-9}$ | a 6 = −9.75855 × 10$^{-10}$ |
| a 7 = 4.28082 × 10$^{-11}$ | a 7 = −9.38666 × 10$^{-12}$ |
| a 8 = 3.33172 × 10$^{-12}$ | a 8 = 2.11516 × 10$^{-12}$ |
| a 9 = 0.0 | a 9 = 0.0 |
| a10 = −4.98459 × 10$^{-16}$ | a10 = −2.47364 × 10$^{-16}$ |

| (The aspheric coefficients in the ninth surface) |
| --- |
| a 3 = −3.34528 × 10$^{-4}$ |
| a 4 = 2.58582 × 10$^{-5}$ |
| a 5 = −9.20688 × 10$^{-7}$ |
| a 6 = 6.73642 × 10$^{-9}$ |
| a 7 = 5.74517 × 10$^{-12}$ |
| a 8 = 5.93360 × 10$^{-12}$ |
| a 9 = 0.0 |
| a10 = −3.07790 × 10$^{-15}$ |

EXAMPLE 3

Figure 8:
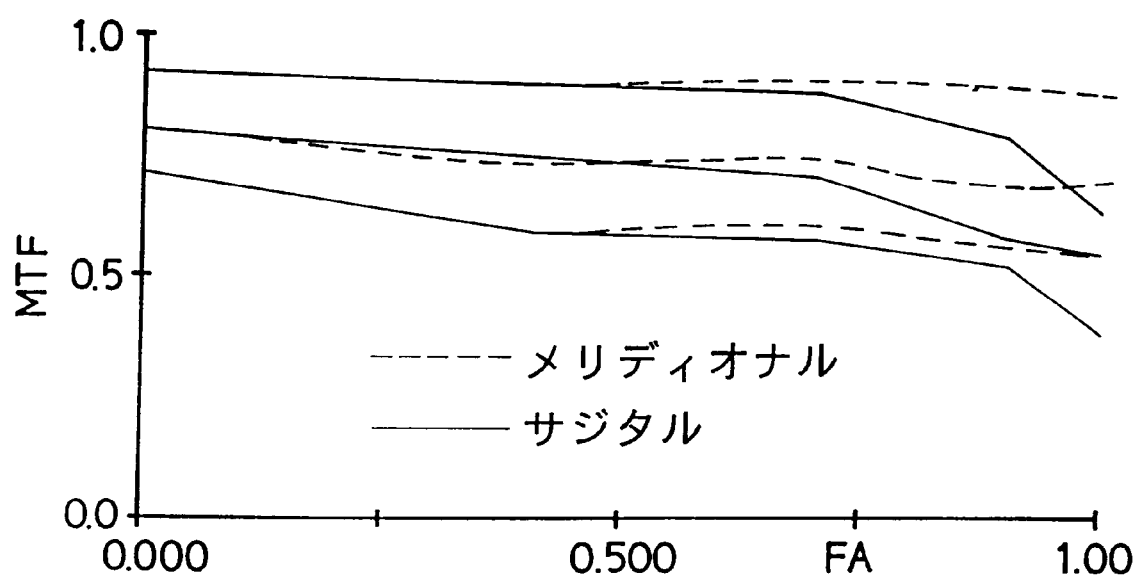
FIG. 8 is a performance chart showing the optical performance (MTF) of a projection lens according to Table 5 in Example 3 of Embodiment 1.

FIG. 7 is a structural view of a projection lens according to Example 3 of Embodiment 1 of the present invention. In Example 3, the lens thickness in the second, third and fourth groups is thinner than that in Example 1, so that the plastic lens can be easily formed and the manufacturing cost decreases. The optical specification is the same as in Example 1. Next, Table 5 shows specific values in the case where the temperature in all groups is 20° C. FIG. 8 shows the optical performance (MTF) in this case.

TABLE 5

| Surface Radius (mm) | Distance between Surfaces in the Axial Direction (mm) | Ne |
| --- | --- | --- |
| r 1 = 81.884 | d 1 = 6.50 | n 1 = 1.49383 |
| r 2 = 129.379 | d 2 = 14.00 |  |
| r 3 = 168.387 | d 3 = 20.00 | n 2 = 1.59142 |
| r 4 = −90.342 | d 4 = 1.20 |  |
| r 5 = 231.936 | d 5 = 9.00 | n 3 = 1.49383 |
| r 6 = 318.530 | d 6 = 7.54 |  |

TABLE 5-continued

| Surface Radius (mm) | Distance between Surfaces in the Axial Direction (mm) | Ne |
|---|---|---|
| r 7 = 1357.890 | d 7 = 8.50 | n 4 = 1.49383 |
| r 8 = −121.945 | d 8 = 27.67 | |
| r 9 = −48.815 | d 9 = 4.00 | n 5 = 1.49383 |
| r10 = −45.000 | d10 = 9.24 | n 5' = 1.44500 |
| r11 = 0.000 | d11 = 14.10 | n 6 = 1.56560 |
| r12 = −350.000 | | |

(1) $f0/f1 = 77.6/432.1 = 0.18$
(2) $f0/f2 = 77.6/102.4 = 0.76$
(3) $|f5/f34| = |-140.5/204.3| = 0.69$
(4) $d2/f0 = 14.0/77.6 = 0.18$
(5) $f4/f3 = 227.0/1670.3 = 0.14$

The aspheric coefficients in each surface are as follows.

| (The aspheric coefficients in the first surface) | (The aspheric coefficients in the second surface) |
|---|---|
| a 3 = 1.44095 × 10$^{-5}$ | a 3 = −9.65318 × 10$^{-6}$ |
| a 4 = −2.58231 × 10$^{-6}$ | a 4 = 1.94048 × 10$^{-6}$ |
| a 5 = 5.84728 × 10$^{-8}$ | a 5 = −9.76061 × 10$^{-8}$ |
| a 6 = −1.92544 × 10$^{-9}$ | a 6 = 1.68234 × 10$^{-9}$ |
| a 7 = −4.48762 × 10$^{-12}$ | a 7 = 1.87336 × 10$^{-12}$ |
| a 8 = 3.86425 × 10$^{-13}$ | a 8 = −8.52746 × 10$^{-14}$ |
| a 9 = 0.0 | a 9 = 0.0 |
| a10 = 3.27720 × 10$^{-18}$ | a10 = 1.38583 × 10$^{-17}$ |

| (The aspheric coefficients in the fifth surface) | (The aspheric coefficients in the sixth surface) |
|---|---|
| a 3 = 7.29028 × 10$^{-7}$ | a 3 = −7.35794 × 10$^{-6}$ |
| a 4 = −6.54176 × 10$^{-7}$ | a 4 = −6.75104 × 10$^{-7}$ |
| a 5 = 8.54509 × 10$^{-9}$ | a 5 = −1.23404 × 10$^{-7}$ |
| a 6 = −1.05866 × 10$^{-9}$ | a 6 = 3.00334 × 10$^{-9}$ |
| a 7 = 7.62347 × 10$^{-11}$ | a 7 = 1.77574 × 10$^{-11}$ |
| a 8 = −7.66596 × 10$^{-13}$ | a 8 = −5.97151 × 10$^{-13}$ |
| a 9 = 0.0 | a 9 = 0.0 |
| a10 = −6.81724 × 10$^{-17}$ | a10 = −4.88865 × 10$^{-17}$ |

| (The aspheric coefficients in the seventh surface) | (The aspheric coefficients in the eighth surface) |
|---|---|
| a 3 = 5.58232 × 10$^{-6}$ | a 3 = −4.27221 × 10$^{-5}$ |
| a 4 = −3.55523 × 10$^{-6}$ | a 4 = 3.76013 × 10$^{-6}$ |
| a 5 = 1.97478 × 10$^{-7}$ | a 5 = −1.19546 × 10$^{-7}$ |
| a 6 = −8.47007 × 10$^{-9}$ | a 6 = −3.15890 × 10$^{-10}$ |
| a 7 = 6.46760 × 10$^{-11}$ | a 7 = 8.25041 × 10$^{-12}$ |
| a 8 = 3.31989 × 10$^{-12}$ | a 8 = 2.22764 × 10$^{-12}$ |
| a 9 = 0.0 | a 9 = 0.0 |
| a10 = −1.26959 × 10$^{-15}$ | a10 = −7.36831 × 10$^{-16}$ |

| (The aspheric coefficients in the ninth surface) |
|---|
| a 3 = −2.90344 × 10$^{-4}$ |
| a 4 = 2.12294 × 10$^{-5}$ |
| a 5 = −7.95632 × 10$^{-7}$ |
| a 6 = 7.60148 × 10$^{-9}$ |
| a 7 = 5.66648 × 10$^{-12}$ |
| a 8 = 3.13935 × 10$^{-12}$ |
| a 9 = 0.0 |
| a10 = −1.78424 × 10$^{-15}$ |

Embodiment 2

Figure 9:
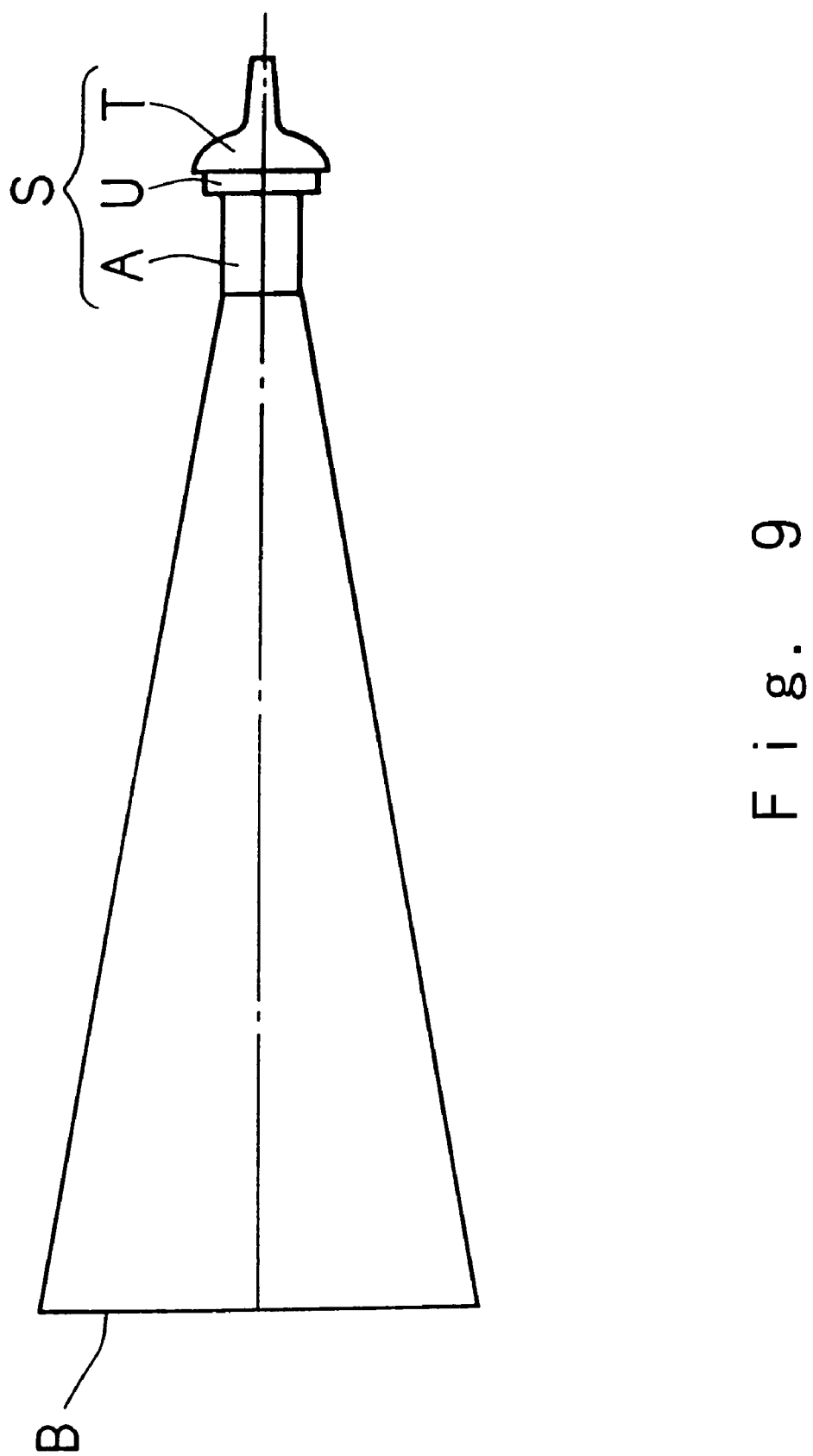
FIG. 9 is a structural view showing an example of an image-magnifying projection system according to Embodiment 2.

FIG. 9 is a structural view showing an example of an image-magnifying projection system according to Embodiment 2 of the present invention. In FIG. 9, A indicates the projection lens shown in Embodiment 1, T is a CRT for projecting images, and U indicates an optical coupling unit that optically couples A and T. An image-magnifying projection system S of the present invention will be constructed therefrom. In FIG. 9, B indicates an optimum focal plane of images projected by the image-magnifying projection system. According to such Embodiment 2, the optimum focal plane B of images also is hardly shifted in the case where the temperature of the CRT faceplate changes.

Embodiment 3

Figure 10:
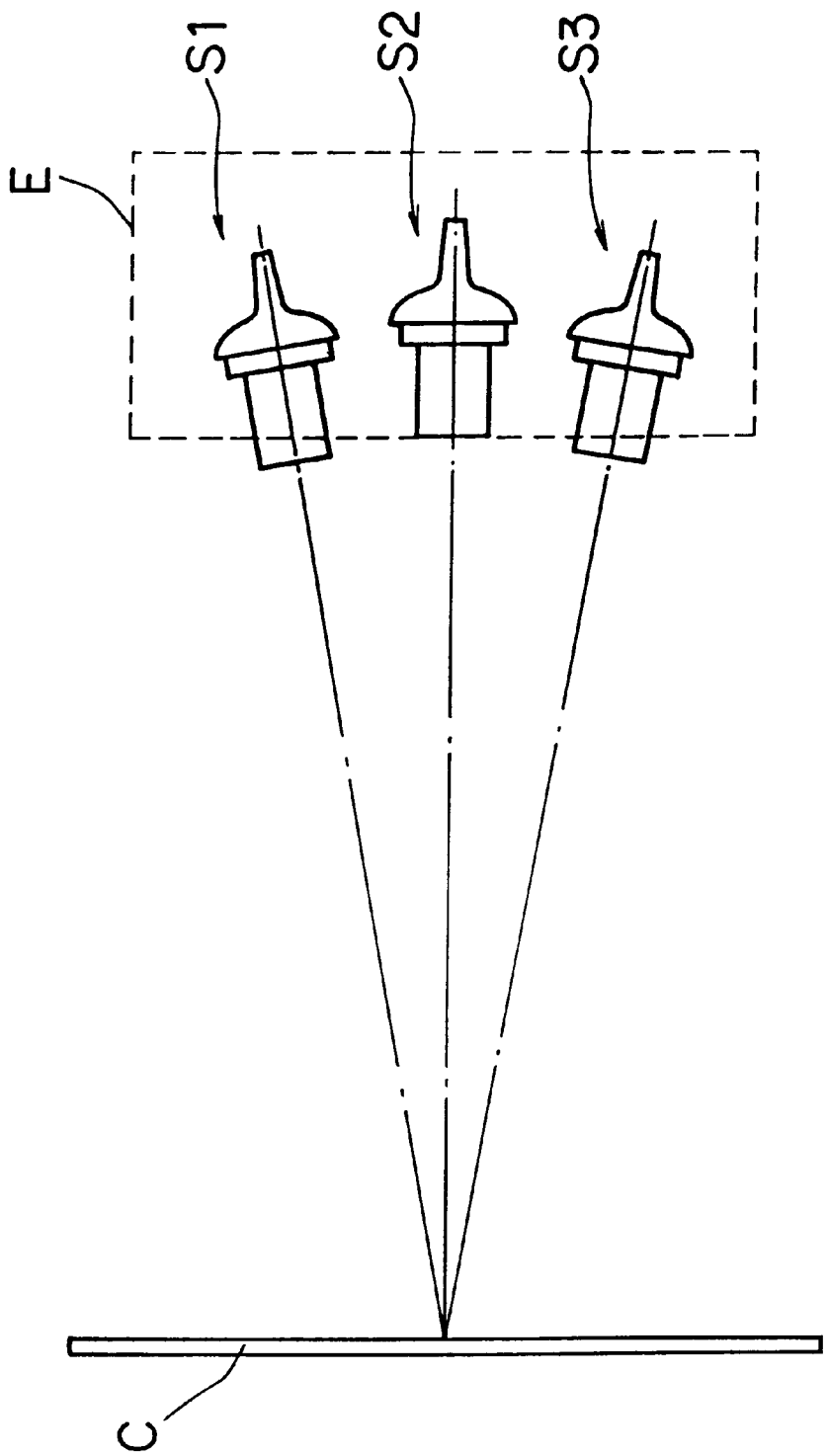
FIG. 10 is a structural view showing an example of a video projector according to Embodiment 3.

FIG. 10 is a structural view showing an example of a video projector according to Embodiment 3 of the present invention. In FIG. 10, S1, S2 and S3 are the image-magnifying projection systems shown in Embodiment 2. S1, S2 and S3 are provided with a monochromatic CRT for blue, a monochromatic CRT for green and a monochromatic CRT for red, respectively. A video projector E of the present invention comprises 3 image-magnifying projection systems S1, S2 and S3 and has a structure in which the magnified images projected from these image-magnifying projection systems can be synthesized on a screen C that is prepared separately. According to such Embodiment 3, the optical focusing performance on the screen does not change when the temperature in the CRT faceplate changes. Consequently, the video projector can be used right after turning it on without set-up time for obtaining an excellent optical focusing performance as in a conventional set.

Embodiment 4

Figure 11:
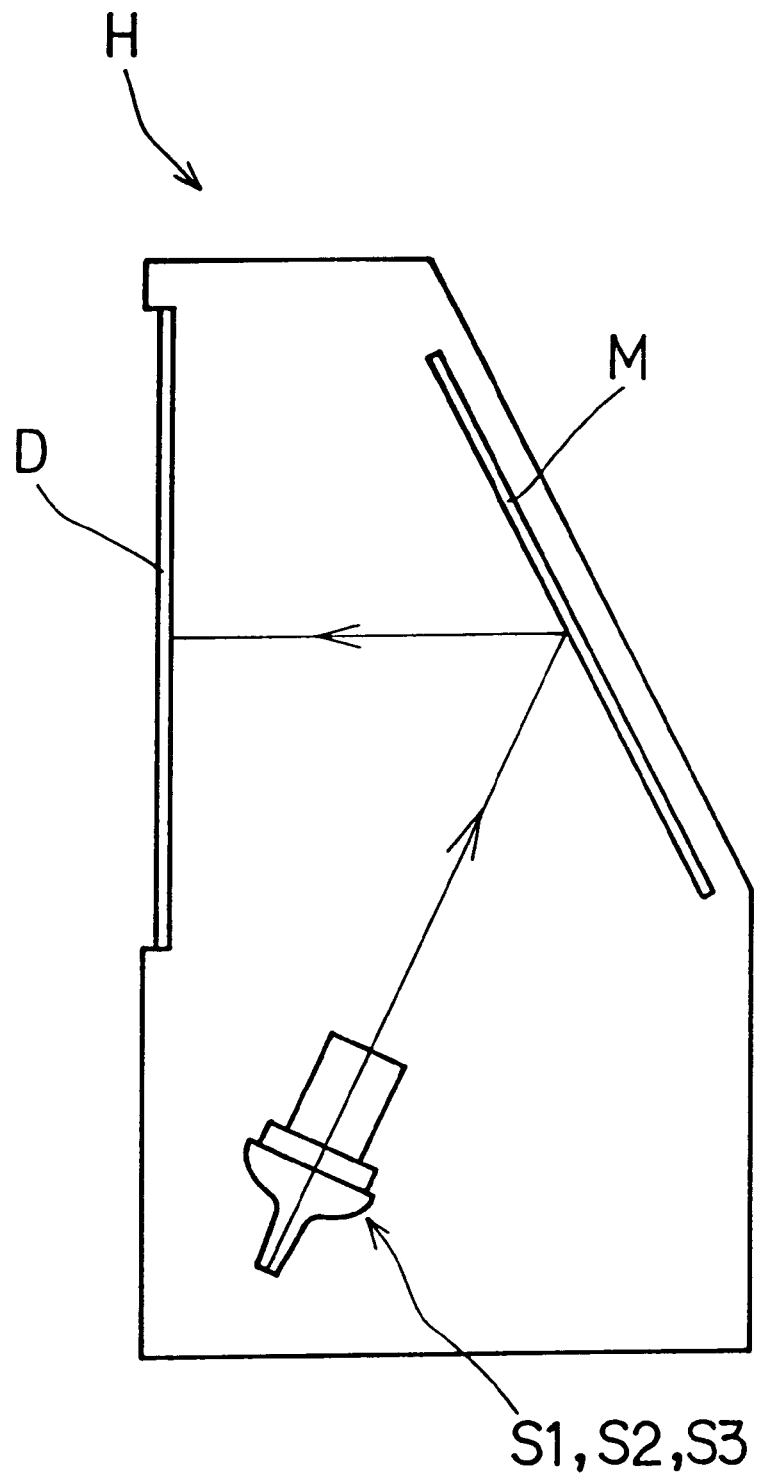
FIG. 11 is a structural view showing an example of a projection TV according to Embodiment 4.

FIG. 11 is a structural view showing an example of a projection TV according to Embodiment 4 of the present invention. In FIG. 11, S1, S2 and S3 are the image-magnifying projection systems shown in Embodiment 2. S1, S2 and S3 are provided with a monochromatic CRT for blue, a monochromatic CRT for green and a monochromatic CRT for red, respectively. In the figure, M indicates a mirror on which beams are reflected, and D indicates a transmission screen. A projection TV H of the present invention will be constructed therefrom. According to such Embodiment 4, the optical focus on the screen is not shifted as time passes after turning on the projection TV and therefore excellent images can be viewed continuously. When setting the half angle of view of the projection lens to 35 degrees or more, a compact set can be realized.

The embodiments described above are to be considered in all respects as illustrative for the purpose of making the technical contents of the present invention clear and the present invention is not to be interpreted by limiting to such embodiments. The present invention can be carried out by changing the embodiments variously within the spirit and the range described in the appended claims, and the present invention should be interpreted broadly.

What is claimed is:

1. A projection lens for projecting an image onto a screen, comprising 5 lenses in 5 groups including: a first-group lens that is a positive lens; a second-group lens that is a positive lens having the largest positive power in the whole lens system; a third-group lens that is a positive lens; a fourth-group lens that is a positive lens; and a fifth-group lens that is negative lens with a concave surface facing a screen side, in order from the screen side, wherein each said lens of the first, third, fourth and fifth groups has at least one aspheric surface, no intervening lens is present between the third group lens and the fourth group lens, and conditions (1) 0.0<f0/f1<0.2,
(2) 0.6<f0/f2<0.9,
(3) 0.6<|f5/f34|<0.8, and
(4) 0.0<d2/f0<0.2, wherein f0 is a focal length of the whole projection lens system, f1 is a focal length of the first-group lens, f2 is a focal length of the second-group lens, f5 is a focal length of the fifth-group, f34 is a synthesized focal length of the third group lens and the fourth group lens, and d2 is an air space between the first-group lens and the second-group lens, are satisfied.

2. A projection lens according to claim 1, wherein a condition (5) $0.0 < f4/f3 < 0.5$, wherein f3 is a focal length of the third-group lens, and f4 is a focal length of the fourth-group lens, is satisfied.

3. A projection lens according to claim 1, wherein both surfaces of the first-group lens, the third-group lens, and the fourth-group lens are aspheric surfaces.

4. A projection lens according to claim 1, wherein the half angle of view is 35 degrees or more and the F-number is 1.1 or less.

5. An image-magnifying projection system, comprising the projection lens according to claim 1, a CRT that projects images, and a unit for coupling the projection lens and the CRT.

6. A video projector comprising three image-magnifying projection systems according to claim 5, each image-magnifying projection system comprising a monochrome CRT of the color blue, green or red, wherein the magnified images obtained from the image-magnifying projection systems are synthesized on a screen.

7. A projection TV, comprising the image-magnifying projection system according to claim 5, a mirror, and a transmission screen, wherein the mirror reflects beams projected from the projection lens, and images are formed on the transmission screen by the projected beams.

* * * * *

UNITED STATES PATENT AND TRADEMARK OFFICE
CERTIFICATE OF CORRECTION

PATENT NO. : 6,081,387                    Page 1 of 5
DATED      : June 27, 2000
INVENTOR(S) : Takahashi et al.

It is certified that error appears in the above-identified patent and that said Letters Patent is hereby corrected as shown below:

Drawing,
Sheet 2 of 11, Error in writing on Figure 3. Writing should be changed from Japanese to English as shown below:

line _ _ _ _ _ should read -- meridional --
    line _____ should read -- sadittal --

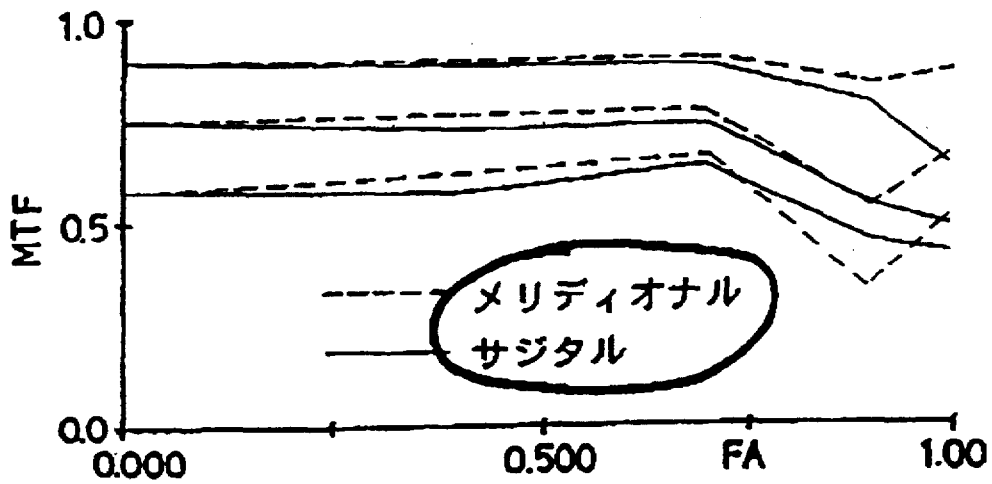

Fig. 2

UNITED STATES PATENT AND TRADEMARK OFFICE
CERTIFICATE OF CORRECTION

PATENT NO. : 6,081,387
DATED : June 27, 2000
INVENTOR(S) : Takahashi et al.

Page 2 of 5

It is certified that error appears in the above-identified patent and that said Letters Patent is hereby corrected as shown below:

Sheet 3 of 11, Error in writing on Figure 3. Writing should be changed from Japanese to English as shown below:

line _ _ _ _ _ should read -- meridional --
line _____ should read -- sadittal --

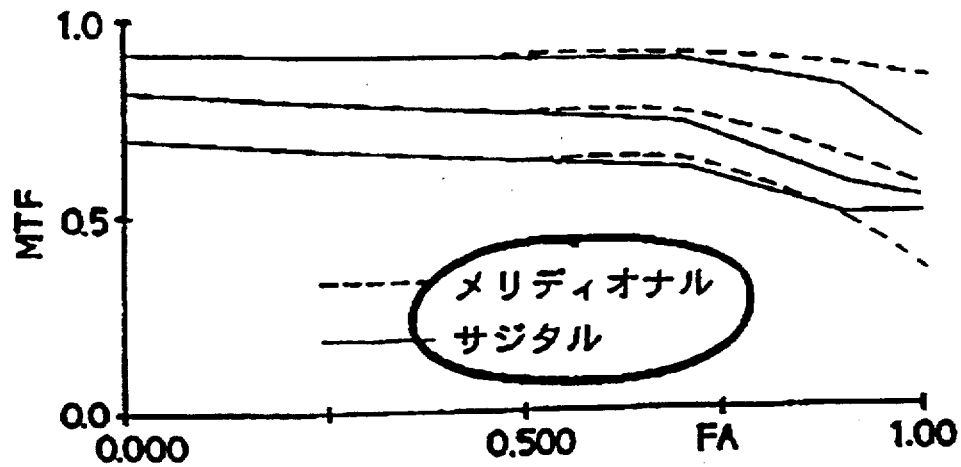

Fig. 3

UNITED STATES PATENT AND TRADEMARK OFFICE
CERTIFICATE OF CORRECTION

PATENT NO.   : 6,081,387                                    Page 3 of 5
DATED        : June 27, 2000
INVENTOR(S)  : Takahashi et al.

It is certified that error appears in the above-identified patent and that said Letters Patent is hereby corrected as shown below:

Sheet 4 of 11, Error in writing on Figure 4. Writing should be changed from Japanese to English as shown below:

line _ _ _ _ _ should read -- meridional --
line _____ should read -- sadittal --

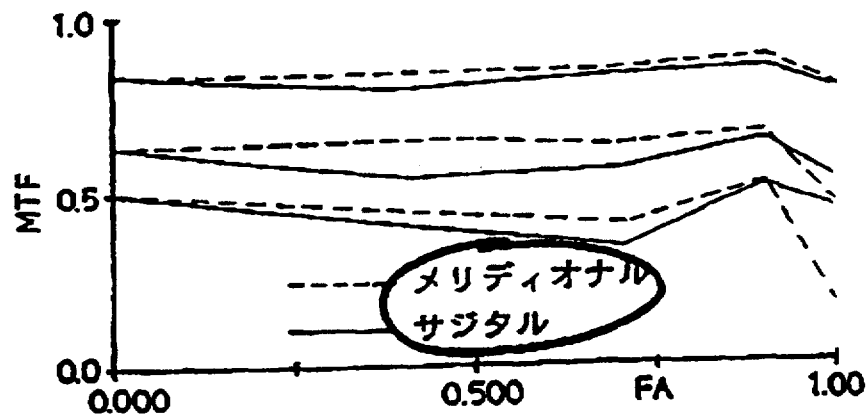

Fig. 4

UNITED STATES PATENT AND TRADEMARK OFFICE
CERTIFICATE OF CORRECTION

PATENT NO. : 6,081,387
DATED : June 27, 2000
INVENTOR(S) : Takahashi et al.

It is certified that error appears in the above-identified patent and that said Letters Patent is hereby corrected as shown below:

Sheet 6 of 11, Error in writing on Figure 6. Writing should be changed from Japanese to English as shown below:

line _ _ _ _ _ should read -- meridional --
line _____ should read -- sadittal --

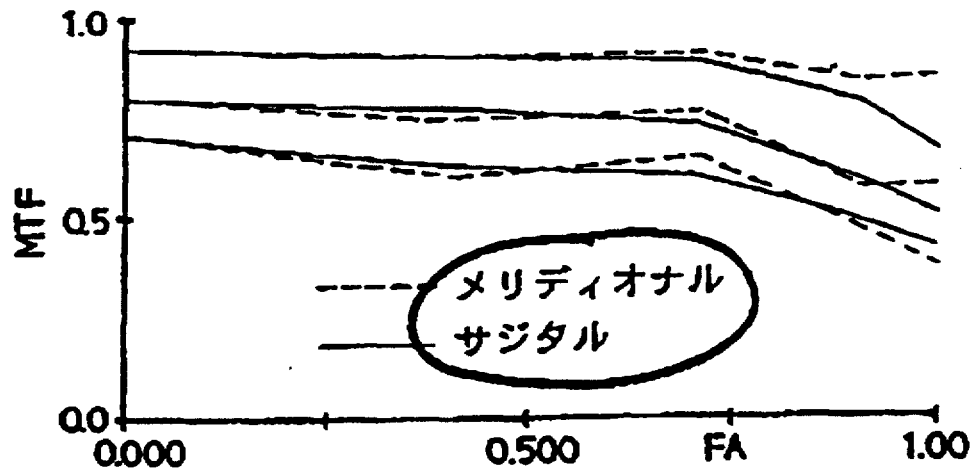

Fig. 6

UNITED STATES PATENT AND TRADEMARK OFFICE
CERTIFICATE OF CORRECTION

PATENT NO.   : 6,081,387                                                Page 5 of 5
DATED        : June 27, 2000
INVENTOR(S)  : Takahashi et al.

It is certified that error appears in the above-identified patent and that said Letters Patent is hereby corrected as shown below:

Sheet 2 of 11, Error in writing on Figure 3. Writing should be changed from Japanese to English as shown below:

line _ _ _ _ _ should read -- meridional --
line _____ should read -- sadittal --

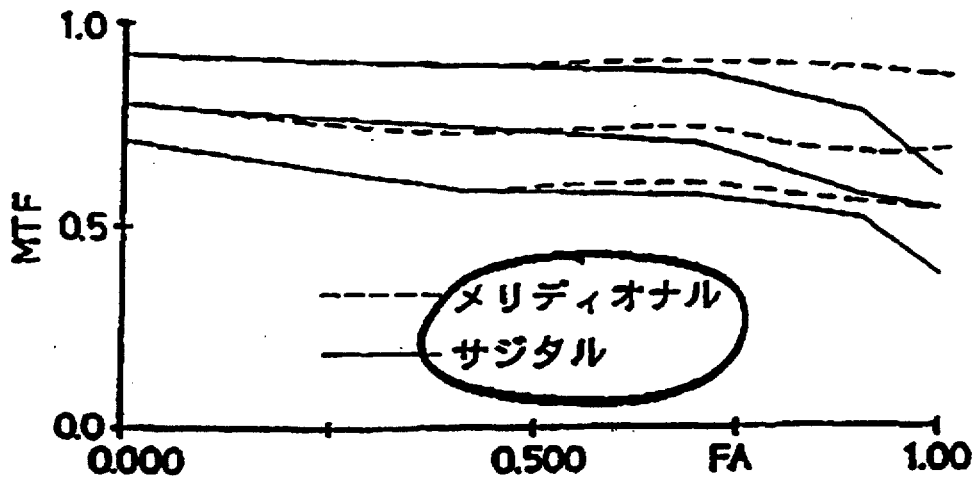

Signed and Sealed this

Twenty-seventh Day of November, 2001

*Attest:*

NICHOLAS P. GODICI
*Attesting Officer*       *Acting Director of the United States Patent and Trademark Office*